Oct. 11, 1966 R. R. GIARRUSSO 3,278,697
CIRCUIT INTERRUPTER FOR AUTOMOTIVE DISTRIBUTORS
Filed March 10, 1965 2 Sheets-Sheet 1
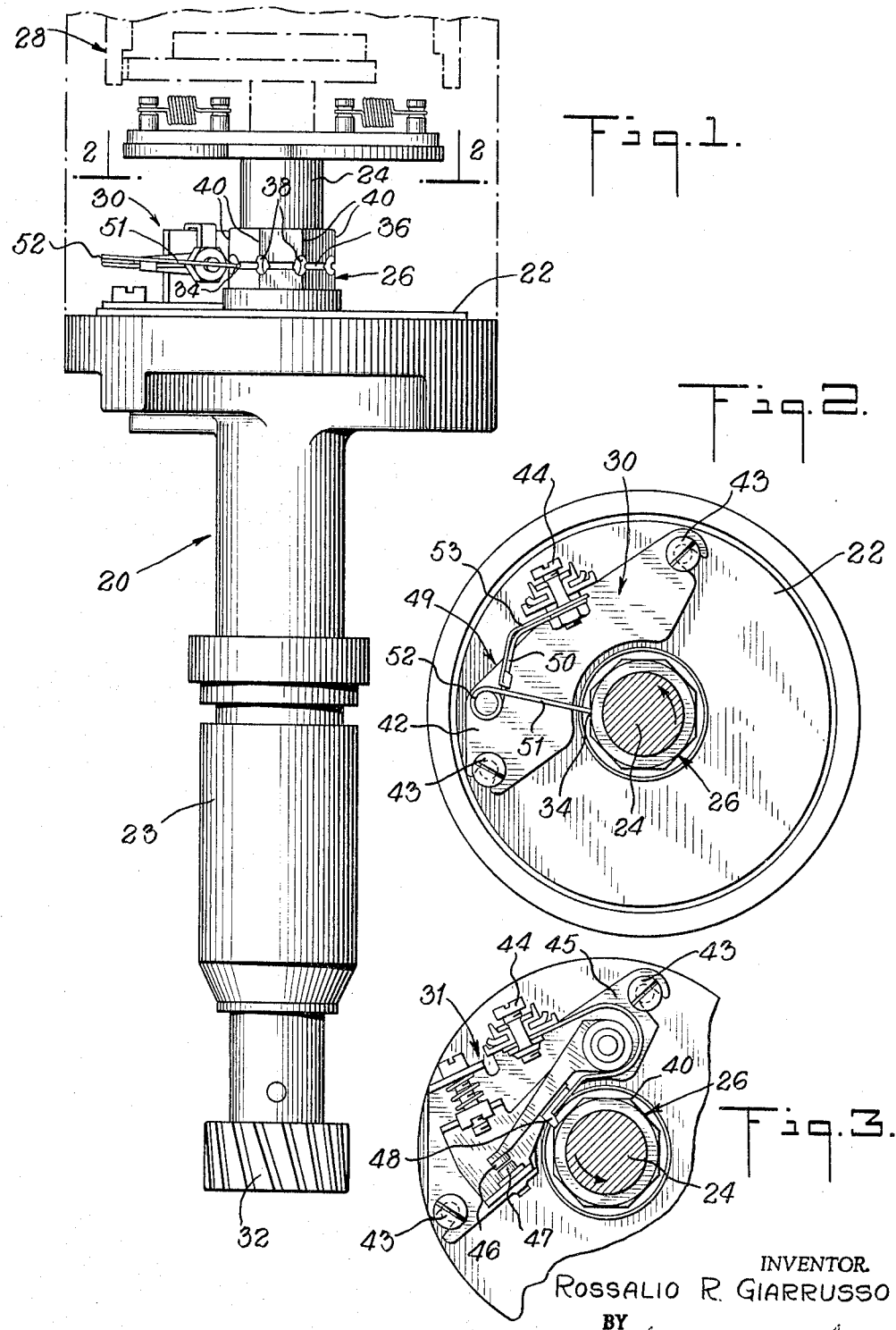
INVENTOR.
ROSSALIO R. GIARRUSSO
BY
Samuelson & Jacob
ATTORNEYS Oct. 11, 1966  R. R. GIARRUSSO  3,278,697
CIRCUIT INTERRUPTER FOR AUTOMOTIVE DISTRIBUTORS
Filed March 10, 1965  2 Sheets-Sheet 2

INVENTOR.
ROSSALIO R. GIARRUSSO
BY
Samuelson & Jacob
ATTORNEYS

United States Patent Office 3,278,697
Patented Oct. 11, 1966

3,278,697
CIRCUIT INTERRUPTER FOR AUTOMOTIVE
DISTRIBUTORS
Rossalio R. Giarrusso, 185 Ames St., Hackensack, N.J.
Filed Mar. 10, 1965, Ser. No. 438,678
2 Claims. (Cl. 200—19)

The invention relates to circuit interrupters for automotive distributors and in particular to those interrupters which may be used with the usual coil and condenser ignition systems or with transistorized ignition systems.

The presently used automotive ignition systems are of two types: first, the coil, condenser and breaker system; and second, the coil, transistor and breaker system. Some of the transistorized systems use interrupters other than the usual breaker points. Generally, when a transistorized system is installed in a vehicle, it is not easily possible to change back to the more standard condenser and breaker system. Until more and more transistorized systems are used and they and their idiosyncrasies become commonly known to the average mechanic, it is advisable that it be simple and easy to change back to the condenser and breaker point system.

Accordingly, it is an important object of the invention to provide a circuit interrupter which may be used with a transistorized automotive ignition system or with a coil and condenser automotive electrical ignition system.

It is a further object of the invention to provide a cam which may be used with a contact pin in either a transistorized or a coil and condenser automotive electrical ignition system.

It is a still further object of the invention to provide such an interrupter which uses the existing cam of a coil and condenser automotive electrical ignition system so that the contact pin may be readily replaced by a standard breaker.

It is a still further object of the invention to provide such a cam which keeps the contact pin in alignment.

It is a still further object of the invention to provide such a circuit interrupter which is more efficient at high speeds than the presently-used devices.

It is a still further object of the invention to provide such a circuit interrupter which eliminates non-firing and thereby prevents carbon build-up on the spark plugs.

These and other objects, features, advantages and uses will be apparent during the course of the following description when taken in conjunction with the accompanying drawings wherein:

FIGURE 1 is a side elevational view of a distributor shaft assembly showing the cam and contact pin of the invention;

FIGURE 2 is a sectional view taken along lines 2—2 of FIGURE 1, viewed in the direction of the arrows, and showing the contact pin of the invention in plan view;

FIGURE 3 is a view similar to that of FIGURE 2 showing the usual breaker of an automotive electrical ignition system;

Figure 4:
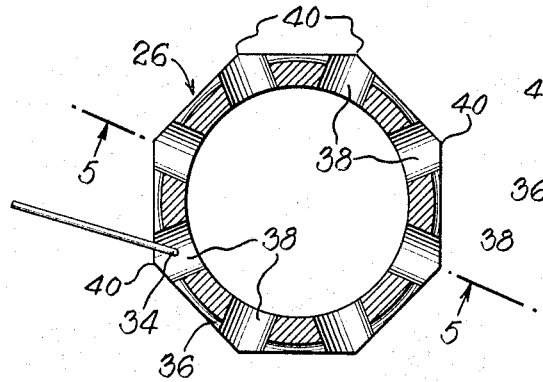
FIGURE 4 is an enlarged horizontal section of the cam of the invention.
Figure 5:
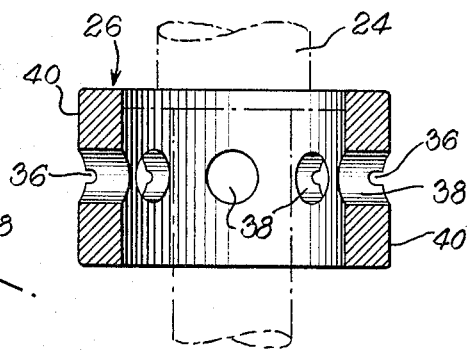
FIGURE 5 is a sectional view taken along the lines 5—5 of FIGURE 4, viewed in the direction of the arrows.

Broadly, the invention is directed toward providing the ordinary distributor cam with a circumferential groove in which the contact pin rides so as to close the electrical ignition circuit. An opening is provided at each high spot in the cam so that the electrical ignition circuit is opened when the high spot passes the pin. When the usual breaker is used, the high spots contact the cam rider and open the breaker points thereby opening the electrical ignition circuit. The contact pin assembly is designed so that it may be mounted in the same place on the frame as the breaker.

The contact pin and the cam of the invention may be used as the circuit interrupter for electrical ignition systems having either a coil and condenser combination or a coil and transistor combination. Thus, it can be seen that the invention permits very flexible operation. If the vehicle is equipped with the contact pin and a transistor circuit and the ignition system becomes inoperative, the transistor circuit may be disconnected and a condenser connected in the electrical ignition circuit in the usual manner. If the trouble is in the contact pin, it may be removed and a breaker installed.

Either the contact pin or the breaker may be used with either a coil-condenser circuit or a coil-transistor circuit. If a mechanic is not familiar with the contact point and the transistor system, it is easy to disconnect that portion of the electrical ignition circuit and connect the well-known breaker and condenser so as to permit the engine to operate.

In the drawings, wherein for the purpose of illustration, is shown a preferred embodiment of the invention, the numeral 20 designates the distributor assembly. Assembly 20 is seen to comprise frame 22, collar 23, shaft 24, cam 26, distributor 28 (details not shown) and contact pin assembly 30.

Shaft 24 is coupled to the engine and is rotated by means of gear 32. Cam 26 is mounted on shaft 24 and rotates past contact pin 34 of contact pin assembly 30. Cam 26 is provided with circumferential groove 36 and openings 38. Each opening 38 is located at a high spot 40 on cam 26. There are as many high spots and openings on the cam as there are cylinders in the automobile engine.

The rotor of the distributor 28 (details not shown) is also rotated by the shaft 24 in the manner which is well-known in the art. The breaker points or the contact pin are timed so that the primary circuit is opened at the ideal time to deliver voltage to the correct spark plug which is connected to the stator of the distributor. The rotor is connected to the high voltage lead of the coil.

In FIGURES 2 and 3 there is shown the mounting of the contact pin assembly 30 and breaker 31 on the frame and their relationship to cam 26. Mounting plate 42 is held to frame 22 by means of screws 43 so that contact pin 34 rides in circumferential groove 36. Connection is made to one side of the primary of the coil through terminal 44. The ground connection is made by contact pin 34 through the cam to the shaft.

Breaker assembly 31 is also mounted on frame 22. Screws 43 are employed to hold mounting plate 45 to the frame. Connection is made to one side of the primary of the coil through terminal 44. The ground connection is made from fixed contact 47 to the frame 22 through mounting plate 45. Movable contact 46 is electrically connected to terminal 44 so that when contact 46 is in contact with contact 47, one side of the primary of the coil is grounded.

When a high spot 40 on the cam passes cam rider 48 (which is also known as a rubbing block or rider block), movable contact 46 is moved away from contact 47. This stops the flow of current in the primary of the coil and induces a high voltage surge in the secondary of the coil which is applied to the spark plug selected by the distributor rotor.

It can readily be seen that the two assemblies 30 and 31 are interchangeable so that a regular breaker assembly 31 may be installed in the event that the contact pin assembly should become defective. The timing of an electrical ignition system using a contact pin assembly 30 is advanced by moving the tip of contact pin 34 opposite to the direction of revolution of the shaft and is retarded by moving the tip of contact pin 34 in the direction of revolution of the shaft.

The size of the openings 38 is made of such size as will permit the electrical circuit to remain open for the same length of time as it does when the usual breaker is used. This time is determined by the characteristics of the particular engine and is a function of the shaft rotation, the size of the opening and the dimensions of the tip of the pin.

The circumferential groove on the cam keeps the contact pin in alignment resulting in more efficient operation at high speeds. Moreover, since non-firing is eliminated, carbon build-up in the spark plugs is prevented.

Figure 6:
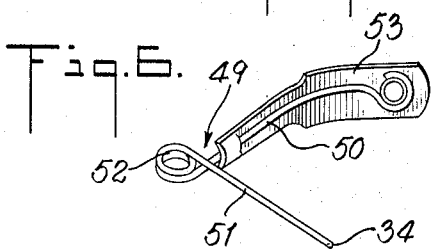
FIGURES 6 and 7 are perspective views of the contact pin assembly of the invention.
Figure 7:
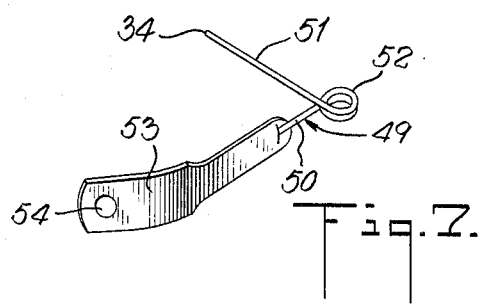

Perspective views of a portion of the contact pin assembly are shown in FIGURES 6 and 7. Shank 49 is formed of a metallic material such as bronze or brass and has two legs 50 and 51 with a flexible loop 52 formed at the junction of the legs. The timing may be adjusted by moving leg 51 in the desired direction. Leg 50 is held in position by means of saddle 53 which is mounted to mounting plate 42 at terminal 44 which is placed in opening 54 (FIGURES 2, 6 and 7).

Figure 8:
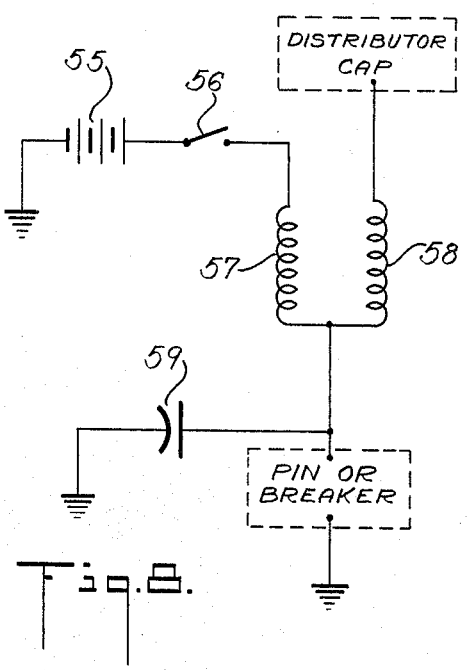
FIGURE 8 is a schematic circuit diagram of a coil and condenser automotive electrical ignition system.

A schematic circuit diagram of standard electrical ignition system is illustrated in FIGURE 8. It comprises battery 55, switch 56, coil primary 57, coil secondary 58 and condenser 59. With switch 56 closed, when the pin is in contact with the cam or the breaker points are closed, current flows through primary 57. When the breaker points open or the contact pin passes over an opening in the cam, current stops flowing in primary 57 and a high voltage is induced in secondary 58. The high voltage is applied to a spark plug through the distributor. The condenser 59 is used to absorb the arc caused by the opening of the breaker points or the opening of the circuit between the contact pin and the cam.

Figure 9:
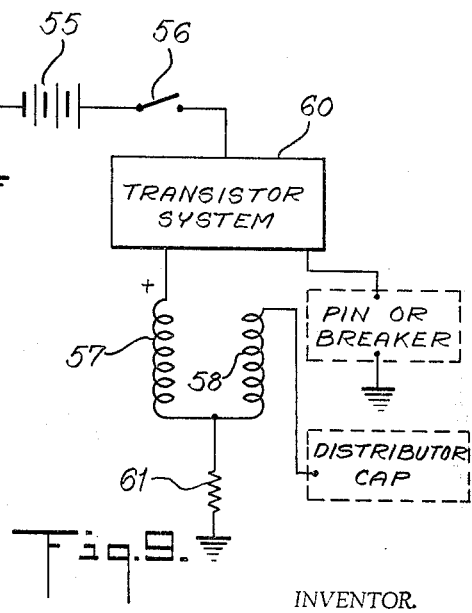
FIGURE 9 is a schematic circuit diagram of a transistorized automotive electrical ignition system.

In the system of FIGURE 9, a transistor system 60 and a ballast resistor 61 are installed in the electrical ignition circuit. No condenser is needed if either a breaker or a contact pin is used because there is no high current flow through the contacts. The transistor system 60 is a switching system which is turned on and off by the action of the circuit interrupter (breaker or contact pin). The circuit is arranged so that a high voltage is induced in secondary 58 when the breaker points are open or the contact pin is being passed by an opening in the cam. These transistor circuits are well-known in the art and several of them may be found in Transistor Ignition Systems Handbook by Brice Ward, published by Howard W. Sams & Co., Inc., 1963.

It will be apparent that the invention is not to be limited to the embodiment set forth in the drawings and description, and that variations may be made in form and construction without departing from the spirit and scope of the invention as defined in the appended claims.

What is claimed is:
1. An electrical ignition system for an automotive engine having at least one cylinder comprising:
   a frame;
   a distributor having a rotor and a stator mounted on the frame;
   a coil and a condenser mounted on the frame;
   a shaft connected to the rotor of the distributor to rotate the same;
   a cam having as many high spots thereon as there are cylinders in the automotive engine mounted on the shaft;
   a circumferential groove in the cam;
   the cam having openings therein in line with the circumeferential groove, there being one opening at each high spot in the cam;
   a conductive contact pin mounted on the frame such that the conductive contact pin rides in the circumferential groove in the cam, making contact with the cam when it is in the groove and making no contact with the cam when it is passed by the openings in the cam so that the circuit of the electrical ignition system is closed when the conductive contact pin is in the circumferential groove and is opened when the conductive contact pin is passed by each opening in the cam.

2. A cam for mounting on a rotatable distributor shaft for an electrical ignition system for an automotive engine having a plurality of cylinders comprising:
   a body;
   a plurality of high spots on the body, there being one high spot for each cylinder of the automotive engine;
   the body having a circumferential groove therein and an opening at each high spot in line with the circumferential groove.

References Cited by the Examiner

UNITED STATES PATENTS

| | | | |
|---|---|---|---|
| 2,435,914 | 2/1948 | Wihanto | 200—27 |
| 2,902,552 | 9/1959 | Oliveira | 200—28 |
| 3,116,379 | 12/1963 | Foster | 200—30 |

BERNARD A. GILHEANY, *Primary Examiner.*

H. M. FLECK, *Assistant Examiner.*